J. W. ANDERSON.
TROLLEY WHEEL REPLACER.
APPLICATION FILED FEB. 25, 1909.

955,742.

Patented Apr. 19, 1910.

WITNESSES:

INVENTOR:
J. W. ANDERSON,
by Fred B. Featherstonhaugh
attys

UNITED STATES PATENT OFFICE.

JOHN WILLIAM ANDERSON, OF HAMILTON, ONTARIO, CANADA, ASSIGNOR OF ONE-HALF TO ALLITH MANUFACTURING COMPANY LIMITED, OF HAMILTON, CANADA, A CORPORATION OF CANADA.

TROLLEY-WHEEL REPLACER.

955,742.      Specification of Letters Patent.    Patented Apr. 19, 1910.

Application filed February 25, 1909. Serial No. 479,952.

*To all whom it may concern:*

Be it known that I, JOHN WILLIAM ANDERSON, of the city of Hamilton, in the county of Wentworth, in the Province of Ontario, Canada, have invented certain new and useful Improvements in Trolley-Wheel Replacers, of which the following is the specification.

My invention relates to improvements in trolley wheel replacers, and the object of the invention is to devise a simple cheap device of this class attachable to an ordinary trolley wheel, which will effectually replace the wheel on the wire and in which the wear will be inappreciable.

My invention consists essentially of two tapered grooved extensions projecting one on each side of the trolley wheel stamped or formed up out of sheet steel in hollow form and provided with suitable bushings and connected to the trolley wheel as hereinafter more particularly explained.

Figure 1:
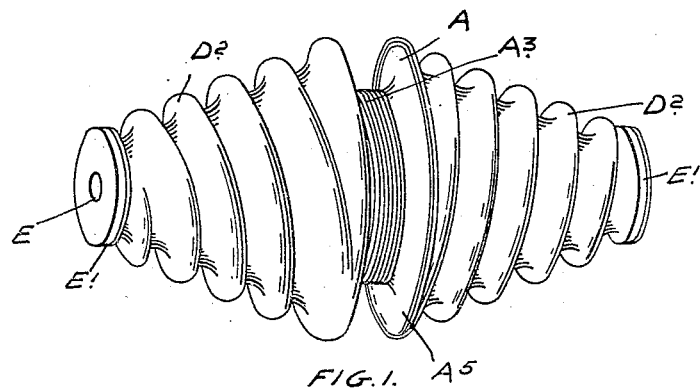
Figure 2:
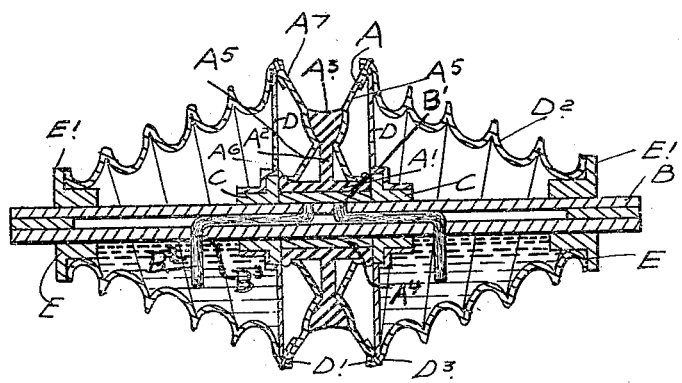
Figure 3:
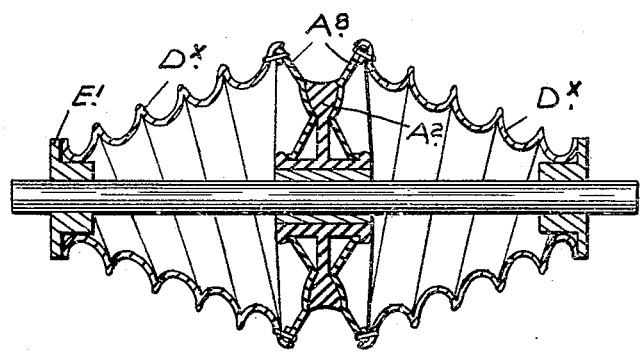

Figure 1, is a perspective view of a trolley wheel provided with my improved replacing device. Fig. 2, is a longitudinal section through the preferred form. Fig. 3, is a longitudinal section showing the modification.

In the drawings like letters of reference indicate corresponding parts in each figure.

A is a trolley wheel comprising the hub portion $A'$, the web portion $A^2$ provided with a running groove $A^3$ and the bushing $A^4$.

B is a trolley wheel axle on which the bushing is located.

$A^5$ $A^5$ are side plates of the wheels, which extend at the inside within the annular projections $A^6$ of the hub $A'$ and at the outer edge are provided with annular beads $A^7$ formed by turning the edge of the metal over upon itself.

C are bushings secured on the axle B and abutting the hub $A'$.

D are end disks stamped or formed up to fit the bushings C and provided with an outer edge flange $D'$ overhanging the bead $A^7$ of the side flanges of the groove of the trolley wheel.

$B^2$ is a tapered extension stamped or formed up out of sheet metal with a spiral groove from the inner edge to the outer edge necessarily gradually reducing in diameter. The extension $D^2$ extends from both sides of the trolley wheel and has an overhanging flange $D^3$, which is riveted, soldered or otherwise suitably fastened to the overhanging flange $D'$. It will now be seen that the spiral groove formed in the stamped up extension $D^2$ extends from inside to outside rising on to the top of the side flanges of the groove of the trolley wheel.

E are end bushings provided with flanges $E'$ upon which is fitted the end of the extensions $D^2$.

It will now be seen that when the trolley wheel is on the wire it will rotate on the axle B within the stationary extensions as said extensions are stationary when the wire is in contact with the trolley wheel.

Should the trolley wheel pass from under or jump the trolley wire and the extensions pass on to the wire such extensions will rotate and the helical spiral groove of the same co-acting with the wire will cause such extensions to move laterally on the wire until the trolley wheel passes directly underneath the wire again into its normal running position.

In Fig. 3, I show a simplified form in which the inner edge of the extensions $D^\times$ are riveted to the side plates $A^8$ at their outer crimped edges. These side plates, in this instance, form a stationary part of the trolley wheel, the central web carrying the grooved rim $A^2$ rotating on the axle B. The action, however, in both forms is exactly the same, the extensions $D^\times$ rotating when the groove $A^2$ passes from beneath the wire and remaining stationary when the groove $A^3$ of the trolley wheel is under the wire.

It will be noticed in Fig. 2, that I show the axle B hollow and I make orifices $B'$ through the hollow axle and at the top under the bushing of the wheel. I also provide wicks $B^2$, which extend into such orifices through the hollow axle and through supplemental orifices $B^3$ into oil, which is contained within the hollow extensions.

It will thus be seen that I have provided a very effective and simple means for the lubrication of the bushing as it rotates on the axle.

What I claim as my invention is:

1. In a trolley wheel replacer, the combination with the trolley wheel and axle, of tapered extensions having flanges formed on their inner ends and provided with a spiral helical groove extending from the inner end to the outer end, inner and outer bushings for the extensions, an inner end plate secured to the inner bushing and having flanges projecting over the edge of the sides of the trolley wheel groove to which the flanges formed on the inner end of the extensions are connected as and for the purpose specified.

2. In a trolley wheel replacer, the combination with the hollow extensions and trolley wheel interposed between them provided with a suitable bushing, of the hollow axle having orifices opposite the bushing and at the outside of the bushing, and wicking extending through the orifice and hollow axle into the hollow extensions said hollow extensions containing oil as and for the purpose specified.

JOHN WILLIAM ANDERSON.

Witnesses:
B. BOYD,
R. COBAIN.